C. F. Spencer,
Lifting Jack,
№ 28,613. Patented June 5, 1860.
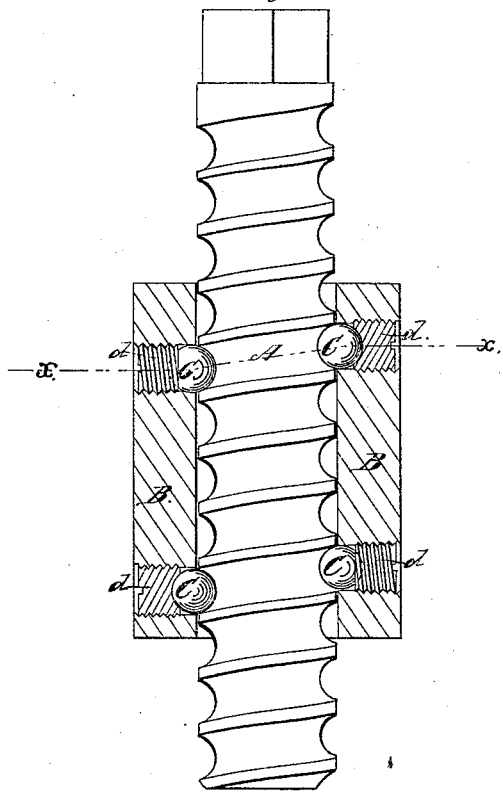
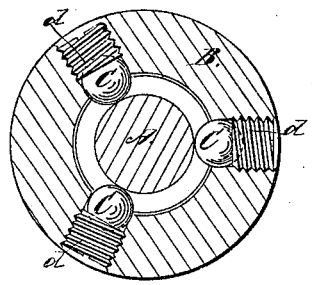
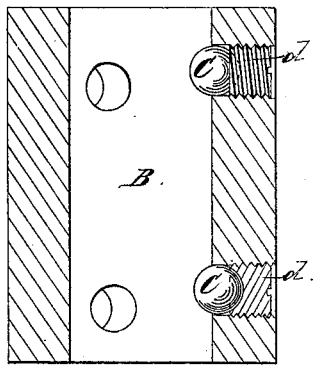
Witnesses
J. Fraser.
S. J. Allis.
Inventor:
C. F. Spencer.

UNITED STATES PATENT OFFICE.

CHARLES F. SPENCER, OF ROCHESTER, NEW YORK.

IMPROVEMENT IN ANTI-FRICTION SCREWS AND NUTS.

Specification forming part of Letters Patent No. 28,613, dated June 5, 1860.

*To all whom it may concern:*

Be it known that I, CHARLES F. SPENCER, of Rochester, in the county of Monroe and State of New York, have invented a new and Improved Anti-Friction Screw and Nut; and I do hereby declare that the following is a full and exact description thereof, reference being had to the accompanying drawings, making part of this specification, in which—

Figure 1 is a vertical section of the nut with the screw represented in elevation. Fig. 2 is a vertical section of the nut alone. Fig. 3 is a section on the line $x\ x$ of Fig. 1.

Similar letters designate corresponding parts in all of the figures.

My improvement is designed to be applied to those screws which are used for purposes requiring great power, as jack-screws and other lifting and pressing screws, to obviate a portion of the friction, which is necessarily great in screws of this class on account of their large size and strength. My design is to increase the strength of the screw-thread by constructing it of a different form, and to reduce the amount of frictional surface or of surfaces in contact by omitting the thread of the internal screw entirely and substituting therefor movable balls secured in sockets in the nut, as will be hereinafter described.

As represented in the drawings, A is the screw, and B the nut, which consists of a cylinder with a bore corresponding in size with the periphery of the thread of the screw, but not fitting so closely as to occasion any material friction when the screw is turned. The screw has a thread formed by a concave groove of semicircular form, which fits the exposed portion of the friction-balls C C. These balls are made of hardened steel or other suitable metal and are placed in sockets in the nut-piece, each of which is provided with a screw-plug $d\ d$, which is concave at the end presented to the ball and by means of which the balls may be adjusted to fit more or less closely to the screw. The ball-sockets are arranged on a plane corresponding with the pitch of the screw, there being three or more balls in the circumference of the nut to afford equal bearings all round, and these triplets are repeated every three or four threads, more or less, according to the length of the screw. The balls roll in their sockets when the screw is turned, as the largest amount of surface-contact is with the groove of the thread, thus reducing the amount of frictional surface to a very small fraction of that of the common male and female screw. The plugs $d$ may be secured in any other manner than by a screw-thread that is consistent with the amount of strain to which they are subjected.

It might appear that the balls would be prevented from revolving by the stationary surfaces of the socket and screw-plug $d$, against which they rest; but such is not the case, since the groove and ball from having their surfaces inclined to each other are wedged together by the weight upon or the resistance of the screw, producing a much greater degree of adhesion than between the surfaces of the ball and socket, which are relatively at right angles to each other, or nearly so, and the greater the weight or resisting force of the screw the more certain are the balls to turn, and thus greatly reduce the friction.

The form of the screw-thread, it will be seen, is much better adapted for great strength than the square thread, inasmuch as its breadth at the base and gradual reduction with the shallowness of the groove prevent the possibility of its breaking or "stripping." The balls, being hardened, are not subject to wear and are easily replaced, should it be necessary. The sockets are adapted to receiving and retaining oil for lubrication, and are in fact the only parts that absolutely require it. The construction is quite as cheap as that of the ordinary screw and nut, and its durability much surpasses it, while the most important saving of all is effected in the power employed in operating it.

I do not claim the mere application of rolling friction to screws, nor do I claim simply dispensing with a screw-thread in the nut of a screw; but

What I claim as my invention, and desire to secure by Letters Patent, is—

The employment of anti-friction balls C C, arranged in adjustable sockets in the interior of a threadless nut B, in combination with a screw A, which has screw-threads formed to fit said balls, substantially as and for the purposes herein specified.

C. F. SPENCER.

Witnesses:
J. FRASER,
S. J. ALLIS.